Patented Aug. 14, 1945

2,381,891

UNITED STATES PATENT OFFICE 2,381,891

FUEL COMPOSITION

Fred Elkan, New York, N. Y., assignor to "Incendor," Coal Igniter Company, Inc., New York, N. Y.

No Drawing. Application December 15, 1941, Serial No. 423,026

11 Claims. (Cl. 44—16)

This invention relates to a fuel composition which can be used as a fire kindler for igniting coal, coke, and other fuels in domestic fires and industrial furnaces, in furnaces of locomotive and other boilers, and the like, as well as a fuel in itself, which constitutes kindler and individual fuel all in one.

In the patent to H. Haffner No. 2,227,256 a composition for use as a kindler is described, which consists of particles, such as obtained from coal, and constitutes a material not as readily inflammable in comparison with naphthalene, which forms a more easily inflammable substance, the latter encasing or covering said material together with a mineral oil (which is less readily inflammable than said material) added thereto.

Though this mixture removed completely all the drawbacks of the known kindlers with a porous carrier, on account of dispensing with said porous carrier altogether by using exclusively substances and ingredients of high calorific value, and though this mixture became incandescent very fast and set the fuel on fire in a correspondingly short time, there have been found shortcomings with said mixture which required further improvement.

The mineral oil, which has been used as the most difficultly inflammable constituent of the said mixture of igniting substances showing various degrees of inflammability or volatility, had the task to develop the highest temperature in order to set even the hardest ignitible coal or coke on fire. To this end the mineral oil had to be heated up to about 240°–300° centigrade to become volatile and thereby ignitible. This state was to be achieved in several steps; first, to ignite the readily inflammable substances as naphthalene, then, by means of these the more difficultly inflammable substances as waste coal which was supported by providing sufficient air or oxygen, respectively, and lastly, by means of the latter the most difficultly inflammable substance as mineral oil.

It has been found that only under favorable draft conditions in stoves, furnaces, or the like, the necessary amount of oxygen has been provided for in order to achieve the high temperature necessary to ignite the most difficultly inflammable substances as mineral oil. Therefore, when operated in stoves, furnaces, or the like with poor draft, particularly fireplaces, the mixture burned out in about 10 to 15 minutes, instead of 25 to 30 minutes, and the fire was extinguished leaving a considerable unburned residue, before the most difficultly inflammable substances and in consequence the surrounding fuel was ignited; whereas by provision of sufficient draft the mixture burned out completely leaving practically no residue and developing such high temperature after having ignited the most difficultly inflammable substances, that the surrounding fuel was ignited in a correspondingly short time.

Furthermore it has been found that the old mixture did not cope with the speed requirements for starting the coal fire in most industrial fields, e. g., in railroad use where the locomotive engines have to be ready for service in a predetermined time.

It is the primary object of the present invention to provide an improved igniting mixture which achieves its state of maximum of heat efficiency in considerably less time than before and which is less dependent on the draft conditions in stoves, furnaces, or the like and to contract the igniting steps from the readily to the most difficultly inflammable substances into a considerably shorter interval of time.

This object is achieved by composing the mixture of at least two groups of readily inflammable substances or ingredients, one of said groups having higher calorific value than the other and one requiring less draft for sufficient heat development in the burning process than the other, the first group comprising hydrocarbons as naphthalene and the second group comprising substances such as crude oil, kerosene, petroleum, gasoline, waxy, solid material, as paraffin, or the like, effecting the first igniting step, more difficultly inflammable substances or ingredients as coal waste or small coal particles, for instance pit coal, brown or bituminous coal, anthracite or the like, effecting the second igniting step, and most difficultly inflammable substances or ingredients, as mineral oil, tar oil, or any heavy oil, which substances are less readily inflammable than those of the second igniting step, effecting the third igniting step.

By the introduction of said second group of substances or ingredients of a calorific value different from that of the other group into the first igniting step, an igniting bridge from the first to the third igniting step is achieved. The ingredients or substances of the third igniting step will be inflamed by means of the said group of ingredients of the first igniting step and the ingredients of the second igniting step both of which will work cooperatively together. Though a reduction of the entire duration of the burning process will result, nevertheless, a big advantage is achieved due to the fact that within this shorter burning time an accumulation of the heat inherent in the ingredients of the composition is effected by a partly coincidence of the burning periods of the different ingredients with the result that quite an unexpected heat impact will arise. This unexpected heat impact is due to the fact that higher temperatures are effected on account of the reduction of the burning period of each of the ingredients and furthermore that the burning process of the most difficulty inflammable oils is accelerated in the presence of coal particles or their oxidized products which work as catalytic agent. By this impact it is now possible to ignite quite a large amount of coal, coke or the like by means of a comparatively very small amount of igniting material with never before achieved rapidity.

One of the groups of the readily inflammable material as naphthalene serves not only the purpose as an ingredient of the first igniting step but fulfills also a very important task in the preparation of the composition, which task consists in encasing and covering the solid material together with the incorporated oils.

This composition can be used as kindler and as individual fuel in itself as well, preferably in the first case in granulated form and in the latter case in briquet form. An ignitible material of waxy, solid substance as paraffin or some other readily inflammable, meltable material can be added to the group of the material forming the first igniting step, when briquets are formed.

It is another object of the present invention to provide a method of preparing a fuel composition according to which granulated or briqueted material is produced. This object is achieved by mixing at least two solid substances, one of which has a melting point of not more than 80° centigrade, with liquid ingredients. This mixture is then heated above the melting point of the said easily meltable substance, which is preferably crystallizable also, and agitated vigorously. After this procedure the said easily meltable substance is integrally united with and solidifies said liquid ingredient in the following cooling off process at the same time covering the other solid substance thereby forming a solid material. When a crystallizing, easily meltable substance is used, the cooling off process is arranged in a sudden and quick way by spreading out the heated mass in order to achieve the crystallized form of the substance. When briquets are formed the heated mass is pressed in cold press devices, which even may be equipped with a cooling apparatus.

Though most of the advantages of the new composition have been pointed out, a further advantage is to be seen in the fact that when building a coal fire the entire coal charge can be filled into the furnace from the outset on top of the fire kindler before the latter is ignited and thus also labor and time is saved compared with other artificial or natural kindlers which worked under gradual filling of the coal charge.

Furthermore, the new briquet has an outstanding superiority over all known regular coal and coke, packaged fuel, or briquets based on the following facts: (1) It is the first coal product which is ignitible by a match representing kindler and coal both in one. (2) In consequence of this convenient and quick ignitibility of the briquet the heating effect of the fuel starts immediately after its ignition. (3) The said heat effect, due to the unique composition of the briquet excells that of all other natural or artificial coal products. (4) Finally, due to the condensed high calorific composition of the briquet one obtains considerably stronger heat effect with a lesser amount of fuel and in much shorter time than with any other kind of natural of artificial fuel.

In the preferred embodiment of the invention the fuel composition in its use as a kindler comprises about 16 to 30% naphthalene, at least 50%, but not more than 83% solid, ignitible material as coal particles, about 3 to 14% crude oil, kerosene, petroleum, paraffin, resinous products, or stearic acid and about 4 to 12% mineral oil, tar oil, or any heavy oil, whereby said naphthalene by means of its crystallizing capacity encases and covers all the other materials. In its use as a fuel in itself the mixture contains about 3 to 7% paraffin, resinous products, or stearic acid in addition to or substitution of crude oil, petroleum, or kerosene.

By heavy oil is understood an oil having a very high specific gravity and which requires a relatively high temperature to inflame the same. Such particular heavy oils are used for instance in heavy oil motors. By coal particles it is understood coal from dust to pieces in size of approximately one inch.

The following examples are given.

The mixture is composed as follows in percent of weight:

Example 1

|   |   | Percent |
|---|---|---|
| 1a. | Naphthalene, as the readily inflammable substance | 22 |
| 1b. | Crude oil | 4 |
| 2. | Small or waste coal particles from dust to one inch pieces, pit coal, brown coal, anthracite, or the like as the more difficulty inflammable substances | 69 |
| 3. | Mineral oil, as the most difficulty inflammable substances | 5 |

Example 2

|   |   | Percent |
|---|---|---|
| 1a. | Naphthalene | 25 |
| 1b. | Crude oil | 5 |
| 2. | Coal particles | 64 |
| 3. | Tar oil | 6 |

Example 3

|   |   | Percent |
|---|---|---|
| 1a. | Naphthalene | 20 |
| 1b. | Crude oil | 3 |
| 1c. | Paraffin | 3 |
| 2. | Coal particles | 64 |
| 3a. | Heavy oil | 6 |
| 3b. | Mineral oil | 4 |

Example 4

|   |   | Percent |
|---|---|---|
| 1a. | Naphthalene | 24 |
| 1b. | Paraffin | 5 |
| 2. | Coal particles | 66 |
| 3. | Mineral oil | 5 |

The high qualities of the old mixture are found again in the mixture of the present invention and the adding of crude oil or the like to the composition does not interfere with these qualities in any way, but increases its calorific value. The high economy of the product is retained and the mixture is not explosive or highly inflammable in storage or transportation.

No spark nor even a lighted cigarette can ignite the hard dry mass. Only a flame like that of a match is capable of igniting said material.

After having described my invention, I am aware of the fact that further modifications can be made therein by persons skilled in the art without departing from the scope of the invention as expressed in the claims.

What I claim is:

1. A fuel composition comprising a mixture of 24% naphthalene and 5% paraffin, said naphthalene and said paraffin being more readily inflammable materials of different calorific value, 66% coal particles being more difficultly inflammable material, and 5% mineral oil being most difficultly inflammable material, said naphthalene together with said paraffin covering said coal particles and said paraffin serving as igniting bridge between naphthalene and mineral oil.

2. A fuel composition comprising a granular mixture of about 16 to 30% naphthalene and about 3 to 14% of additional hydrocarbons of about the same low flash point as said naphthalene but of higher calorific value, about 50 to 83% of finely divided coal material, and about 4 to 12% of hydrocarbons of a higher flash point and higher calorific value than said coal material, said additional hydrocarbons of a low flash point having a calorific value sufficient for igniting said most difficultly inflammable hydrocarbons, said hydrocarbons of a low flash point particularly in support of and in co-operation with the naphthalene adapted to insure the ignition of the said hydrocarbons of a higher flash point, all of the said hydrocarbons being incorporated in said naphthalene and said naphthalene intermixed with said hydrocarbons covering the particles of said coal material.

3. A fuel composition comprising a granular mixture of about 16 to 30% naphthalene and 3 to 14% of an oil of about the same low flash point as said naphthalene, about 50 to 83% of finely divided coal material, and about 4 to 12% of an oil of a higher ignition point than said coal material, said oil of a low flash point having a calorific value sufficient for igniting said oil of a higher ignition point and adapted to insure the ignition of the said oil of a higher ignition point, all the said oils being incorporated in said naphthalene and said naphthalene intermixed with said oils covering by crystallization the particles of said coal material.

4. A fuel composition comprising a granular mixture of about 16 to 30% naphthalene, 3 to 7% of oil and 3 to 7% of solid waxy material, both said oil and said waxy material of about the same low ignition point as said naphthalene, about 50 to 83% of finely divided coal material and about 4 to 12% of oil of a higher ignition point than that of said coal material, and both said oil and said waxy material of a low ignition point having a calorific value sufficient for igniting said oil of a higher ignition point and adapted to insure the ignition of the said oil of a higher ignition point and all the said oils being incorporated in said naphthalene and said solid waxy materials and said naphthalene and said waxy material intermixed with said oils covering the particles of said coal material.

5. A fuel composition comprising a granular mixture of about 16 to 30% naphthalene, 3 to 7% of oil and 3 to 7% of resinous material, both said oil and said resinous material of about the same low ignition point as that of naphthalene, about 50 to 83% of finely divided coal material, and about 4 to 12% of oil of a higher ignition point than that of said coal, said oil and said resinous material, both of a low ignition point having a calorific value sufficient for igniting said oil of a higher ignition point, and adapted to insure the ignition of the said oil of a higher ignition point and all the said oils being incorporated in said naphthalene and said resinous material, and said naphthalene and said resinous material intermixed with said oils covering the particles of said coal material.

6. A fuel composition comprising a granular mixture of about 16 to 30% naphthalene, 3 to 7% of oil and 3 to 7% of stearic acid, both said oil and said stearic acid of about the same low ignition point as that of naphthalene, about 50 to 83% of finely divided coal material, and about 4 to 12% of oil of a higher ignition point than that of said coal, said oil and said stearic acid, both of a low ignition point having a calorific value sufficient for igniting said oil of a higher ignition point and adapted to insure the ignition of the said oil of a higher ignition point, and all the said oils being incorporated in said naphthalene and said stearic acid, and said naphthalene and said stearic acid intermixed with said oils covering the particles of said coal material.

7. A fuel compound comprising a granular mixture of about 16 to 30% naphthalene and 3 to 14% of crude oil of about the same low ignition point as that of naphthalene, about 50 to 83% of finely divided coal material and about 4 to 12% of oil of a higher ignition point than that of said coal and said crude oil of a lower ignition point having a calorific value sufficient for igniting said oil of a higher ignition point and adapted to insure the ignition of the said oil of a higher ignition point, all the said oils being incorporated in said naphthalene and said naphthalene intermixed with said oils covering by crystallization the particles of said coal material.

8. A fuel composition comprising a mixture of about 16 to 30% naphthalene, approximately 3 to 7% crude oil of about the same low ignition point as that of said naphthalene, approximately 3 to 7% paraffin, at least about 50 but not more than about 83% of finely divided coal material, and 5% mineral oil of a higher ignition point than that of said coal material, and said naphthalene, together with said crude oil and said paraffin incorporated in said naphthalene covering said coal material, and said crude oil and said paraffin being adapted to provide an igniting bridge between said naphthalene and said mineral oil of a higher ignition point.

9. A fuel composition comprising a mixture of 22% naphthalene and 4% crude oil of about the same low ignition point as that of said naphthalene, but said crude oil of a higher calorific value than said naphthalene, 69% of finely divided coal particles, and 5% mineral oil of a higher ignition point than that of said coal material, and said naphthalene together with said crude oil incorporated in said naphthalene covering by crystallization said coal material, and said crude oil being adapted to provide an igniting bridge between said naphthalene and said mineral oil.

10. A fuel composition comprising a mixture of 25% naphthalene and 5% crude oil of about the same low ignition point as that of said naphthalene, but of higher calorific value than said naphthalene, 64% of finely divided coal particles, and 6% tar oil of a higher ignition point than that of said coal material, and said naphthalene together with said oils incorporated in said naphthalene, covering by crystallization said coal particles, and said crude oil being adapted to serve as igniting bridge between said naphthalene and said tar oil.

11. A fuel composition comprising a mixture of 20% naphthalene, 3% crude oil of about the same low ignition point as that of said naphthalene, and 3% paraffin of a higher calorific value than said naphthalene, 64% of finely divided coal particles, 4% mineral oil and 6% any other heavy oil, both said mineral oil and heavy oil of a higher ignition point than that of said coal material, and said naphthalene and said paraffin together with the said oils incorporated in said naphthalene and paraffin, covering said coal particles and said crude oil and said paraffin being adapted to serve as igniting bridge between said naphthalene and said mineral oil and heavy oil, respectively.

FRED ELKAN.